UNITED STATES PATENT OFFICE.

MICHAEL MATHES, OF JERSEY CITY, NEW JERSEY, ASSIGNOR OF ONE-HALF TO GUSTAV STEUP, OF SAME PLACE.

SILICATED PAINT.

SPECIFICATION forming part of Letters Patent No. 270,450, dated January 9, 1883.

Application filed September 21, 1882. (No specimens.)

*To all whom it may concern:*

Be it known that I, MICHAEL MATHES, of Jersey City, Hudson county, State of New Jersey, have invented a new and useful Improvement in Silicated Paints, of which the following specification is a full, clear, and exact description.

This invention relates to a new body for paint, in which no oil is used, and which is very cheap. The paint may be used on houses, fences, stone walls, and similar articles.

The invention consists of a compound of street-dust, gravel, granite, and lime mixed in a particular proportion, so as to form a body-paint readily dissolvable in water, all as hereinafter more fully set out.

In preparing my improved paint I proceed as follows: I take, per measure, thirty parts of ordinary street-dust, thirty parts of finely-pulverized gravel, and twenty parts of finely-pulverized granite. These parts are well mixed, and suitable coloring-matter is added. They should then remain exposed to the air for a few days, after which are added twenty parts of slaked lime, which is thoroughly worked into the mixture.

If the paint is applied to a stone wall, its surface should be moistened after application. On glass, iron, and wood it should be covered with a compound consisting of five parts of water and one part of water-glass.

It will be found that my improved paint is very cheap, will withstand atmospheric influence, and may be cleaned without coming off. Before use the body-paint is dissolved in water.

I do not claim to have invented a composition of lime and a silicate, as that is shown in Patents Nos. 48,745, 48,746, and 48,747, granted to J. E. Van Derburgh, July 11, 1865; but I do claim—

The body-paint composed of thirty parts of street-dust, thirty parts of finely-pulverized gravel, twenty parts of finely-pulverized granite, and twenty parts of slaked lime to form a composition which is dissolvable in water before application, substantially as specified.

MICHAEL MATHES.

Witnesses:
 GUST. STEUP,
 F. V. BRIESEN.